US008510545B2

(12) United States Patent
Bunin

(10) Patent No.: US 8,510,545 B2
(45) Date of Patent: Aug. 13, 2013

(54) SOFTWARE UPDATING OF A SERVER SUPPORTING ELECTRONIC GAMING MACHINES

(75) Inventor: Brian Bunin, Sparks, NV (US)

(73) Assignee: WMS Gaming Inc., Waukegan, IL (US)

( * ) Notice: Subject to any disclaimer, the term of this patent is extended or adjusted under 35 U.S.C. 154(b) by 904 days.

(21) Appl. No.: 12/524,430

(22) PCT Filed: Dec. 18, 2007

(86) PCT No.: PCT/US2007/025884
§ 371 (c)(1),
(2), (4) Date: Jul. 24, 2009

(87) PCT Pub. No.: WO2008/094243
PCT Pub. Date: Aug. 7, 2008

(65) Prior Publication Data

US 2010/0088497 A1 Apr. 8, 2010

Related U.S. Application Data

(60) Provisional application No. 60/897,564, filed on Jan. 26, 2007.

(51) Int. Cl.
*G06F 1/24* (2006.01)
*G06F 9/00* (2006.01)
*G06F 7/00* (2006.01)
*G06F 17/00* (2006.01)
*G06F 17/30* (2006.01)

(52) U.S. Cl.
USPC ........... 713/100; 707/602; 707/694; 707/796; 707/805; 707/809

(58) Field of Classification Search
USPC .............. 713/1, 100; 707/602, 694, 796, 805, 707/809
See application file for complete search history.

(56) References Cited

U.S. PATENT DOCUMENTS

| | | | | |
|---|---|---|---|---|
| 5,708,812 | A * | 1/1998 | Van Dyke et al. | 717/171 |
| 6,645,077 | B2 * | 11/2003 | Rowe | 463/42 |
| 6,884,173 | B2 * | 4/2005 | Gauselmann | 463/42 |
| 2003/0074386 | A1 * | 4/2003 | Schmidt et al. | 709/1 |
| 2003/0083943 | A1 * | 5/2003 | Adams et al. | 705/14 |
| 2003/0217181 | A1 * | 11/2003 | Kiiskinen | 709/248 |
| 2004/0002386 | A1 * | 1/2004 | Wolfe et al. | 463/42 |
| 2004/0093342 | A1 * | 5/2004 | Arbo et al. | 707/102 |
| 2004/0194079 | A1 * | 9/2004 | Nguyen et al. | 717/168 |
| 2006/0264256 | A1 * | 11/2006 | Gagner et al. | 463/20 |
| 2007/0179983 | A1 * | 8/2007 | Putman | 707/200 |

OTHER PUBLICATIONS

Written Opinion corresponding to co-pending International Patent Application Serial No. PCT/US2007/025884, European Patent Office; dated Sep. 1, 2008; 7 pages.
Declaration of Non-Establishment of International Search Report to International Patent Application No. PCT/US2007/025884, European Patent Office; dated Sep. 1, 2008; 2 pages.

* cited by examiner

*Primary Examiner* — Kim Huynh
*Assistant Examiner* — Brandon Kinsey
(74) *Attorney, Agent, or Firm* — Nixon Peabody LLP

(57) ABSTRACT

An illustrative method imports configuration data used by a server that supports electronic gaming machines (EGMs). Configuration data is used by operational software of the server that supports EGMs in a server-client relationship and is stored in accord with a first data structure template that defines records having fields that contain information of the configuration of each EGM. Configuration data stored in fields of records in accord with the first data structure template is automatically transferred to corresponding fields of records in accord with a second data structure template used by new operational software of the server by migration software.

18 Claims, 4 Drawing Sheets

SOFTWARE UPDATING OF A SERVER SUPPORTING ELECTRONIC GAMING MACHINES

CROSS-REFERENCE TO RELATED APPLICATIONS

This application is a U.S. National Stage of International Application No. PCT/US2007/025884, filed Dec. 18, 2007, which claims the benefit of U.S. Provisional Application No. 60/897,564, filed on Jan. 26, 2007, both of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to electronic gaming machine (EGM) systems that support wagering on wagering games in a server-client relationship, and more particularly to updating of software on the server.

BACKGROUND OF THE INVENTION

Gaming machines, such as slot machines and video poker machines, have been a cornerstone of the gaming industry for several years. EGMs, especially microprocessor-based gaming machines that follow a client/server configuration, provide flexibility through software control and the ability to communicate data and download software from a supporting server. The server maintains a list of all supported EGMs and configuration information for each. The server may also have a role in implementing wagering rules promulgated by the governmental jurisdiction, rules by the owner of the gaming software, and rules by the casino owner. Changing the operational software controlling the server can cause a substantial work load on a system administrator in view of re-installation of EGM lists, configuration information, and corresponding rules after the new or updated server software is loaded. Therefore, there is a need to minimize the work associated with a change of operational software that controls the server supporting EGMs in a system.

SUMMARY OF THE INVENTION

According to one aspect of the present invention, an embodiment includes a method that manages configuration data used by a server that supports EGMs. Configuration data is used by operational software of the server that supports EGMs in a server-client relationship and is stored in accord with a first data structure template that defines records having fields that contain information of the configuration of each EGM. Configuration data stored in fields of records in accord with the first data structure template is automatically transferred to corresponding fields of records in accord with a second data structure template to be used by new operational software of the server by migration software.

According to another aspect of the invention, an embodiment includes a server adapted to implement this method.

According to yet another aspect of the invention, a computer readable tangible storage medium is encoded with instructions for enabling a server to perform the above method.

Additional aspects of the invention will be apparent to those of ordinary skill in the art in view of the detailed description of various embodiments, which is made with reference to the drawings, a brief description of which is provided below. The use of the same reference numeral in the drawings is utilized to denote identical or similar elements.

DETAILED DESCRIPTION

Various embodiments of this invention can be utilized. The drawings and descriptions of embodiments of the invention exemplify its principles and are not intended to limit the broad aspect of the invention to only the illustrated embodiments.

Figure 1:
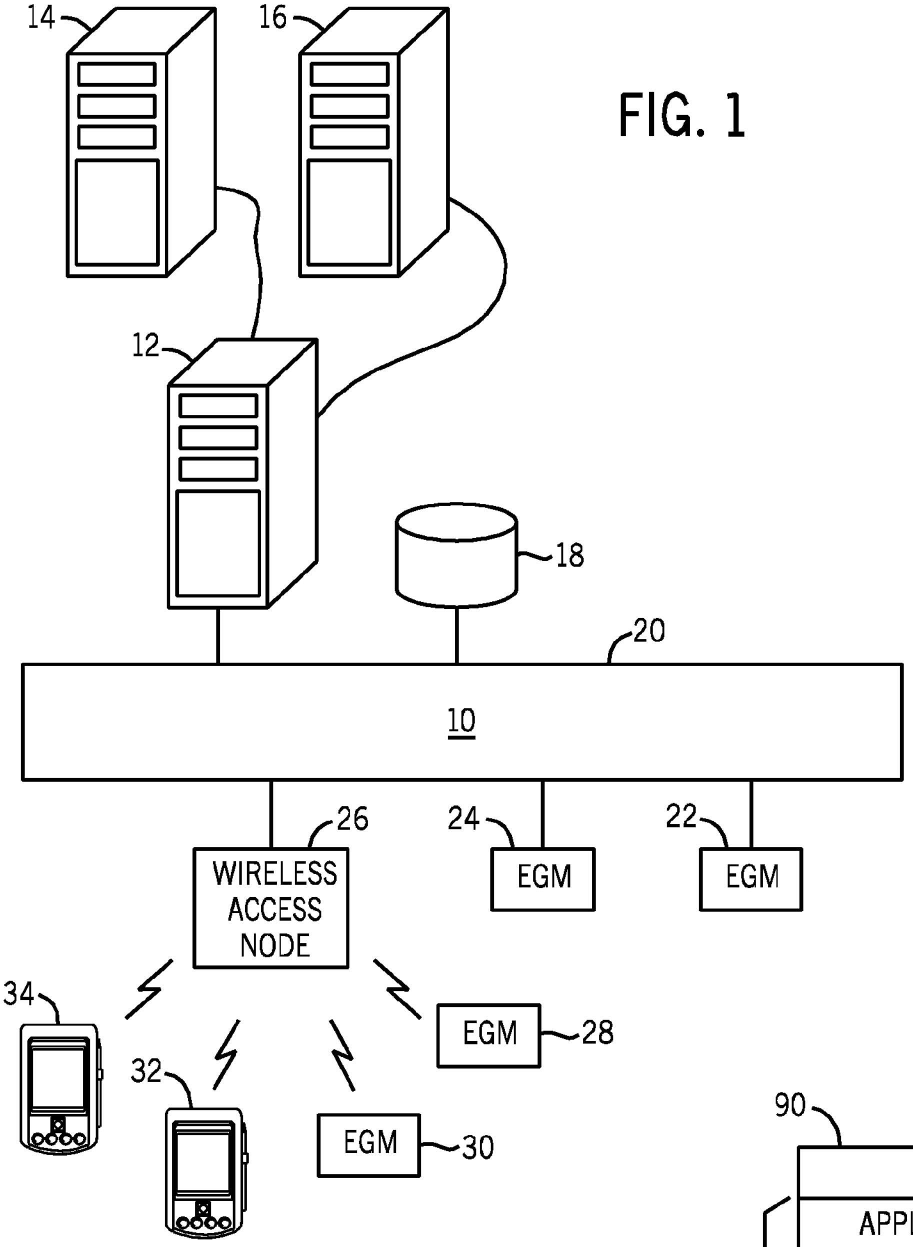
FIG. 1 is a block diagram of a gaming system suited for incorporation of an embodiment of the present invention.

Referring to FIG. 1, an illustrative gaming system 10 includes a server 12 supported by workstations 14 and 16 that provide licensing management and business rules management, respectively. A file server 18 provides a nonvolatile storage resource such as for storing configuration data used by the server and gaming software that can be downloaded to EGMs under the control of the server 12. Workstation 14 is responsible for licensing management and for validating that an EGM has been authorized to receive the download of a new game upon the server 12 receiving a request to download the new game to the EGM. Server 12 operates under instructions from workstation 16 to implement a predetermined set of business rules, i.e. conditions, restrictions and/or requirements that impact the operation of the EGMs. For example, business rules may determine a maximum wager that can be placed at an EGM based on time of day, day of week, etc. Further the server may include a set of rules that govern the operation of the EGMs promulgated by the controlling jurisdiction.

A communication bus 20 provides a bidirectional communication channel among the elements in gaming system 10. In the illustrative system, server 12, file server 18, stationary EGMs 22 and 24, and wireless access node 26 are coupled to bus 20. Stationary EGMs 28 and 30 are each coupled to bus 20 by a wireless communication link supported by the wireless access node 26. Similarly, mobile gaming machines 32 and 34 are each coupled to bus 20 by a wireless communication link supported by the wireless access node 26. A “stationary” EGM refers to electronic gaming machine of a cabinet style that remains fixed during the play of a game by a user. A “mobile” gaming machine refers to an electronic gaming machine contained in a portable apparatus that can be transported by a user during the play of a game. For example, the portable apparatus of a mobile gaming machine could include a laptop computer with wireless capabilities, a personal digital assistant, a cellular telephone with appropriate input and output capabilities, etc.

Figure 2:
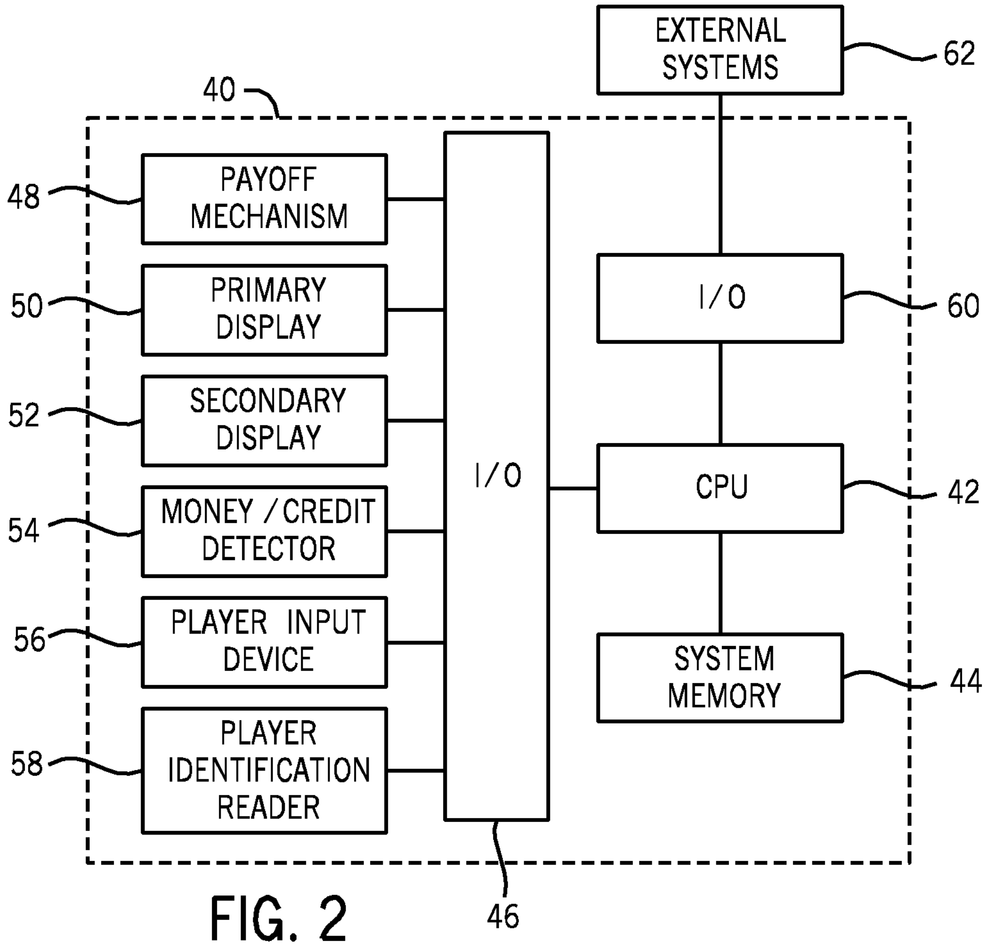
FIG. 2 is a block diagram of a representative EGM.

FIG. 2 shows an exemplary EGM 40 that includes a central processing unit (microprocessor) 42 that is supported by system memory 44 that may include read-only memory, random access memory and a nonvolatile storage memory such as a hard drive. An input/output module 46 supports internal communications between the CPU 42 and various input and output devices. These devices may include a payoff mechanism 48, a primary display 50, a secondary display 52, a money/credit detector 54, a player input device 56 and a player identification reader 58. These devices are intended to be representative of a variety of input and output devices that may be employed by the EGM. A communications input/output device 60 provides an interface between the CPU 42 and external systems 62 enabling bidirectional communications for EGM 40. In accordance with the illustrative system 10, the input/output device 60 would support bidirectional data communications with bus 20 or bidirectional communications over a wireless link with wireless access node 26.

Figure 3:
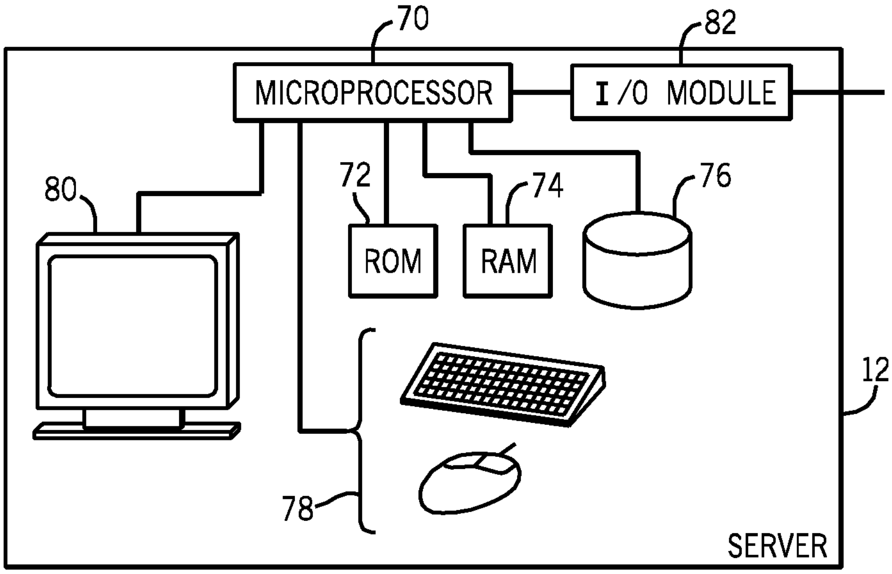
FIG. 3 is a block diagram of a representative server.

FIG. 3 is a representative computing apparatus 12 for a server. It is also applicable as architecture for the workstations 14 and 16 of FIG. 1. A microprocessor 70 performs processes and tasks based on stored program instructions. It is supported by read-only memory (ROM) 72, random access memory (RAM) 74 and nonvolatile data storage device 76. As will be understood by those skilled in the art, data and stored program instructions in ROM 72 is typically utilized by microprocessor 70 to initialize and boot the computing apparatus. An application program, e.g. a program that controls the implementation of one or more functions performed by the server, is stored in storage element 76. At least active portions of the application program will be typically stored in RAM 74 for ready access and processing by microprocessor 70. A variety of user inputs 78 such as a keyboard, keypad, and mouse can be utilized to control the operation of the server and applications running on it. A display screen 80 provides a visual output, e.g. characters and/or charts of operational parameters and visual representation of EGMs and related status of the EGMs, for an administrator of the server. An input/output (I/O) module 82 provides a communication interface permitting microprocessor 70 to transmit and receive data with external nodes.

Figure 4:
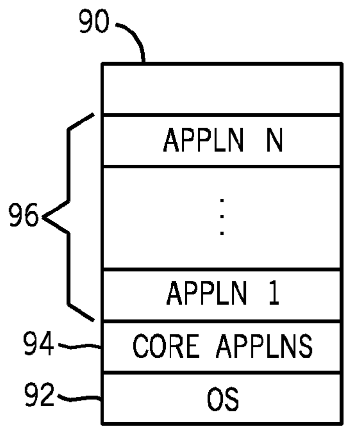
FIG. 4 is a functional block diagram illustrating software used to control the server and/or EGM.

FIG. 4 shows a functional block diagram illustrating software used to control the server. This organization also applies to the EGMs and workstations. The overall software environment 90 includes an operating system (OS) 92 such a Linux, core applications 94 that add functionality to the features of the OS and/or provide an interface with higher level applications 96 that are responsible for implementing user instructions and/or conditions. One of the applications 96, or at least a portion of an application, on the server is responsible for maintaining lists of supported EGMs, stored configuration data for each of the supported EGMs as well as synchronization of this stored data with periodic updates of actual configurations of the respective EGMs. Another of the applications 96, migration software, is responsible for reconfiguring and/or reloading configuration data to be utilized by new operational software loaded into the server in order to minimize work by the system administrator following the operational software change. As used herein "operational software" refers to software on the server that controls execution of the ongoing functions of the server, and "migration software" refers to the described software functionality regardless of whether separate from or incorporated as part of server software.

Figure 5:
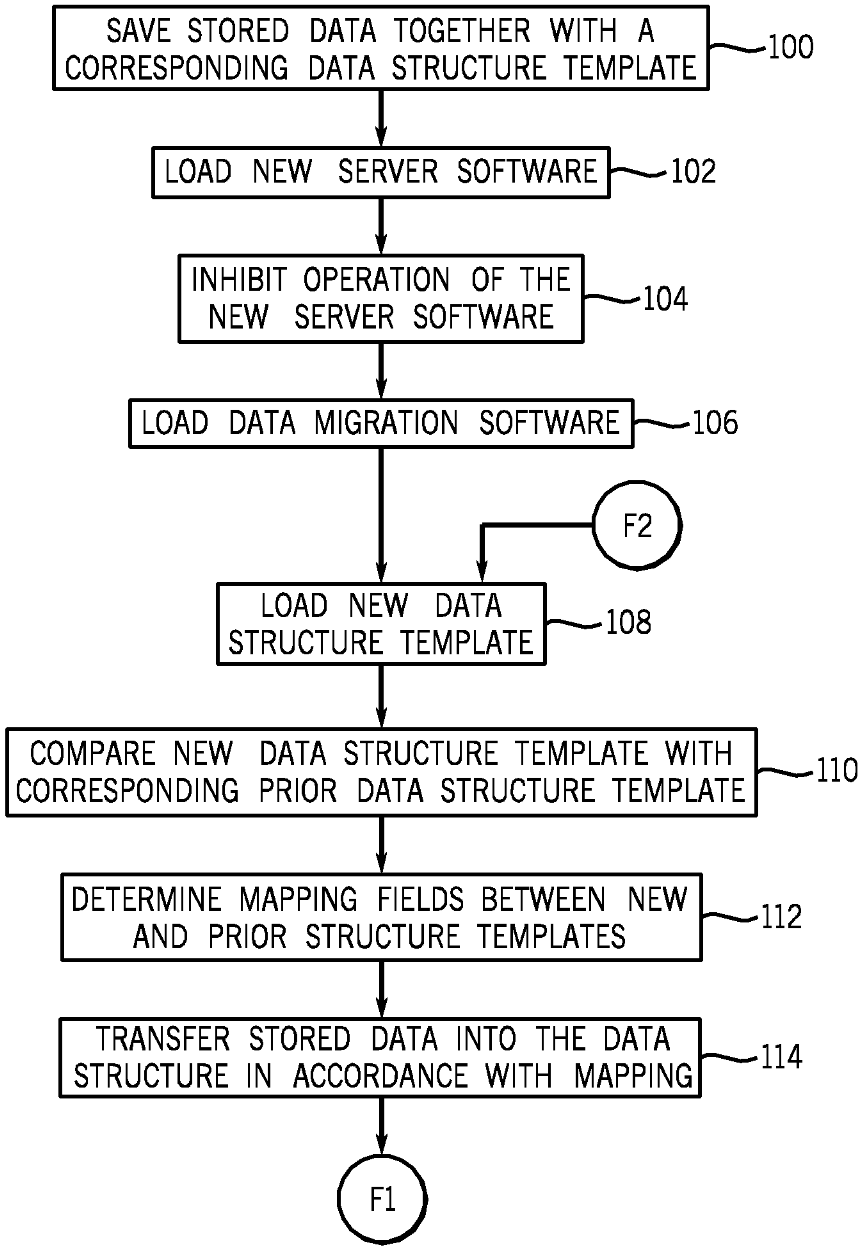
FIGS. 5 and 6 together form a flow chart of an illustrative method in accordance with an embodiment of the present invention.
Figure 6:
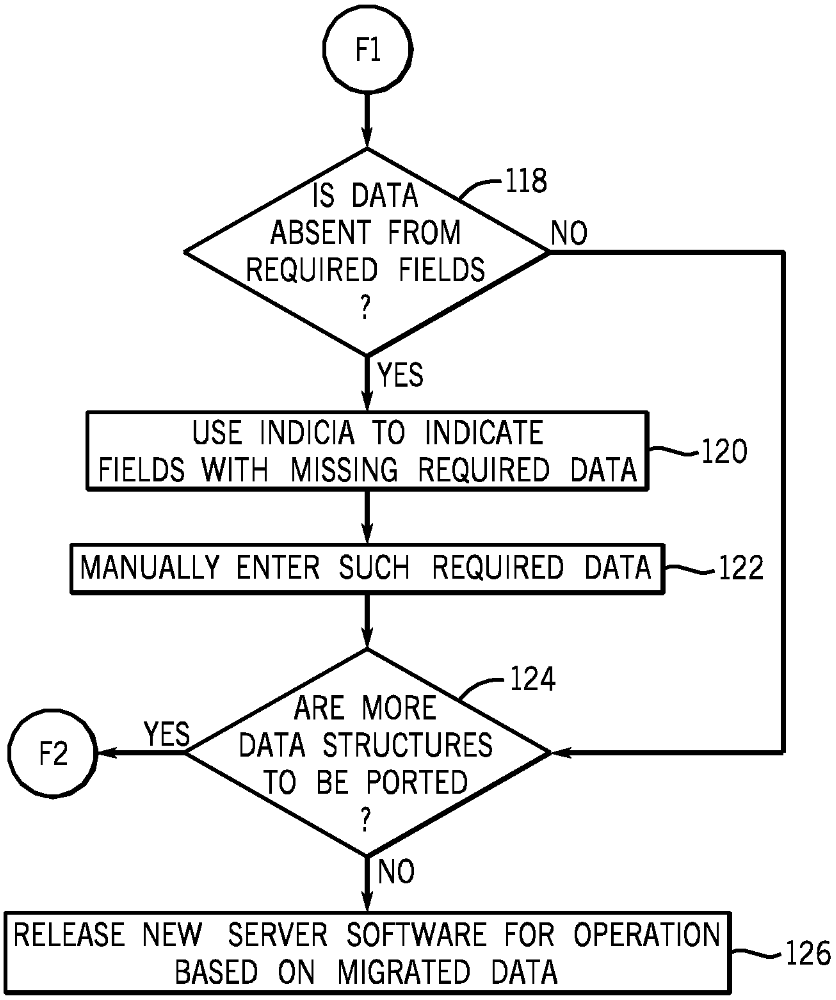

FIGS. 5 and 6 show a flow chart of an illustrative method for retrieving and loading stored configuration data for use with new or modified server software. In step 100 the server saves stored configuration data together with a corresponding data structure template such as in file server 18 that can also serve as a general file storage system. The different types of configuration data can be stored together in one file or in separate files, i.e. the governing rules for the jurisdiction, rules by the software owner, rules by the business (casino) operator and configuration data for each of the EGMs. Preferably a data structure template is also stored for each of the different types of configuration data. The data structure template identifies for each record the name and/or category of data stored in each field, the location of the field in the record, and whether data is required, i.e. must be present, for each field. This action is taken prior to loading new server software or updating the existing server software in order to preserve the existing configuration data New server software is loaded in this example in step 102. As used herein, "new server software" refers to new software or modifications to existing server software that requires reinstallation of some or all of the supporting configuration data. In step 104 the changed server software is inhibited from operation in order to permit configuration data to be restored. Migration software is loaded in step 106 wherein the migration software is specifically adapted to assist in the porting, i.e. transferring, of the stored configuration data into the new server software. In step 108 the migration software loads the new data structure template associated with the new server software. The new data structure template could be the same as or different from the previous data structure template used by the previous server software. The migration software then causes a comparison of the new data structure template with the corresponding prior data structure template in step 110. A determination is made of how to map the fields between the new and prior data structure templates in step 112. For example, a new template associated with EGM configuration data may include new fields or differently positioned fields in each record associated with an EGM as compared with the fields and field positions in the previous EGM configuration template. Tables 1 and 2 below provide an example of different templates. The goal of such mapping is to identify a correspondence of fields in the previous template with fields in the new template so that data contained in the stored configuration data for the corresponding template can be transmitted to the appropriate field for the new configuration data in accordance with the new template. In accordance with step 114 the stored data is transferred under the control of the migration software into new configuration data files in accordance with such mapping and the new data structure.

In step 118 a determination is made of whether data is absent from required fields in the new data structure template. Preferably the new data structure template identifies each field for which data is required to be present. Although data could be required for all fields, a desirable system design will likely include some fields for which data is not required and other fields for which data is required to be present. For example, a field that defines the type of EGM would be classified as required data and a field that defines a particular type of audible/visual signal to be publicly generated by an EGM upon a significant win by a player would be classified as non-required data. Corresponding default data contained in the new data structure may be utilized to populate fields where no previous data exists for such a field. A YES determination by step 118 causes indicia to be utilized to identify fields with missing required data in step 120. For example, records containing fields with missing required data can be shown on the screen of a monitor with such fields being highlighted in a different color for easy identification by a system administrator. In step 122 such required data can be manually entered by the system administrator. Alternatively any required data that is missing could be inserted directly into the associated fields.

In step 124 a determination is made if further data structures are to the ported, i.e. are there other different types of data structures associated with configuration data that have not been processed by the data migration software? A YES determination by step 124 results in processing returning to step 108 in which a new data structure template is loaded for processing. A NO determination by step 124, indicating that the processing of all data associated with the different types of templates has been completed, results in step 126 causing the new server software to be released for operation based on the migrated configuration data.

Tables 1 and 2 illustrate exemplary data configuration templates where Table 1 shows a first template used with existing server software and Table 2 shows a second template used with new server software. Table 2 is shown with data having been imported by the migration software from data as stored in Table 1.

TABLE 1

First Data Configuration Template

| column 1 EGM S.N. | 2 printer type | 3 coin/bill acceptance | 4 game version | 5 jurisdictional maximum wager | 6 game control parameters |
|---|---|---|---|---|---|
| 23109 | 21 | 8906 | 12.3 | 10 | 3489 |
| 34577 | 34 | 8907 | 18.2 | 20 | 3467 |

TABLE 2

Second Data Configuration Template

| column 10 EGM S.N. | 11 firmware version | 12 printer type | 13 game version | 14 coin/bill acceptance | 15 jurisdictional maximum wager | 16 game control parameters |
|---|---|---|---|---|---|---|
| 23109 | | 21 | 12.3 | 8906 | 10 | 3489 |
| 34577 | | 34 | 18.2 | 8907 | 20 | 3467 |

It will be apparent that a new field in column 11 of Table 2 is added for each record and that the fields of columns 3 and 4 of Table 1 are now in reversed location order in columns 13 and 14 of Table 2. The migration software identifies fields, e.g. columns, in Table 2 that correspond to fields in Table 1 of the same parameter such as by matching labels, e.g. "printer". This allows the existing configuration data to be automatically imported into the appropriate field in the new template structure even where new fields or different field locations are present. In this example, Table 2 contains a column 11 "firmware version" that was not present in the first template, and hence requires the entry of configuration data not available from configuration data associated with Table 1. This field can be highlighted on a system administrator's display indicating that data input is needed, or alternatively entered directly into the associated field manually or via a software script. Although the configuration data is shown organized in table form, other types of structures, e.g. vectors, etc., can be used to contain the data.

The server in one example employs one or more computer readable signal bearing tangible media that stores software, firmware and/or assembly language for performing one or more portions of one or more embodiments of the invention. The computer-readable signal-bearing tangible media in one example comprises one or more of a magnetic, electrical, optical, biological, and atomic data storage medium. For example, the computer-readable signal-bearing media may comprise floppy disks, magnetic tapes, CD-ROMs, DVD-ROMs, hard disk drives, USB flash memory and electronic memory modules.

The steps or operations described herein are only examples. There may be many variations to these steps or operations without departing from the spirit of the invention. For instance, the steps may be performed in a differing order, or steps may be added, deleted, or modified. Although migration software is described in the illustrative example, the functions of the migration software may be incorporated as part of the new server software and would be preferably executed prior to the other parts of the new server software assuming operational control of the server.

Each of these embodiments and obvious variations thereof are contemplated as falling within the spirit and scope of the claimed invention, which is set forth in the following claims.

What is claimed is:

1. A method for importing existing configuration data used by a server that supports electronic gaming machines (EGMs) that permit wagering on games, comprising:

using the server to cause the wagering games to be displayed on corresponding displays of the EGMs according to the existing configuration data;

storing the existing configuration data used by first operational software of the server in non-volatile storage, the server supporting the EGMs in a server-client relationship, where the existing configuration data is stored in accord with a first data structure template that defines first records having first fields and identifies for each of the first records a category of the corresponding existing configuration data stored in the associated first record and a location of the corresponding first field in the associated first record, the configuration data including information of the configuration of each of the respective EGMs, wherein the first operational software controls execution of a first set of ongoing functions of the server;

automatically transferring, by migration software operating on the server, at least some of the existing configuration data stored in the first fields of the first records of the first data structure template from the non-volatile storage to corresponding second fields of second records of a second data structure template used by second operational software of the server, where the second operational software differs from the first operational software, where the migration software reconfigures or reloads the existing configuration data to be utilized by the second operational software, wherein the second operational software controls execution of a second set of ongoing functions of the server, where a position of at least one of the first fields in the first data structure template for storing first information of the configuration data differs from a position of a corresponding one of the second fields in the second data structure template for storing the first information; and storing the existing configuration data in accord with the second data structure template for use by the second operational software.

2. The method of claim 1 wherein the transferring further comprises comparing types of second fields in the second data structure template with types of first fields in the first data structure template to determine which, if any, types of first fields in the first data structure template correspond to each type of second field in the second data structure template.

3. The method of claim 2 wherein the transferring further comprises creating a map of the second fields in the second data structure template that match a corresponding first field in the first data structure template.

4. The method of claim 1 further comprising, following the transferring, determining if data is not present in a selected second field in the second data structure template, where the selected second field has been predetermined to require the presence of data.

5. The method of claim 4 further comprising identifying the selected second field by the use of visual indicia on a display screen utilized by a system administrator.

6. The method of claim 1 further comprising loading the second operational software on the server and causing the server to execute the second operational software following the storing and the transferring.

7. A server that supports electronic gaming machines (EGMs) that permit wagering on games comprising:

non-volatile storage device;

microprocessor based system adapted to control the storage of existing configuration data used by first operational software of the server in the non-volatile storage device, the server supporting EGMs in a server-client relationship, where the existing configuration data is stored in accord with a first data structure template that defines first records having first fields that identifies for each of the first records a category of the corresponding existing configuration data stored in the associated first record and a location of the corresponding first field in the associated first record, the configuration data including information of the configuration of each of the respective EGMs, wherein the first operational software controls execution of a first set of ongoing functions of the server; and the microprocessor based system operating under the control of migration software operating on the server is adapted to automatically transfer at least some of the existing configuration data stored in the first fields of the first records of the first data structure template from the non-volatile storage to corresponding second fields of second records of a second data structure template used by second operational software of the server, where the second operational software differs from the first operational software, where the migration software reconfigures or reloads the existing configuration data in accord with the second data structure template for use by the second operational software, and where the second operational software controls execution of a second set of ongoing functions of the server, wherein a position of at least one of the first fields in the first data structure template for storing first information of the configuration data differs from a position of a corresponding one of the second fields in the second data structure template for storing the first information.

8. The server of claim 7 further comprising the microprocessor based system compares types of second fields in the second data structure template with types of first fields in the first data structure template to determine which, if any, types of first fields in the first data structure template correspond to each type of the second fields in the second data structure template.

9. The server of claim 8 further comprising the microprocessor based system creates a map of the second fields in the second data structure template that match a corresponding first field in the first data structure template.

10. The server of claim 7 further comprising the microprocessor based system determines if data is not present in a selected second field in the second data structure template, where the selected second field has been predetermined to require the presence of data.

11. The server of claim 10 further comprising the microprocessor based system identifies the selected second field by the use of visual indicia on a display screen utilized by a system administrator.

12. The server of claim 7 further comprising the microprocessor based system loads said second operational software and causes the server to execute the second operational software.

13. A non-transitory computer readable storage medium encoded with instructions for controlling a server that supports electronic gaming machines (EGMs) that permit wagering on games comprising:

computer readable storage instructions for storing existing configuration data used by first operational software of the server in non-volatile storage, the server supporting EGMs in a server-client relationship, where the existing configuration data is stored in accord with a first data structure template that defines first records having first fields that identifies for each of the first records a category of the corresponding existing configuration data stored in the associated first record and a location of the corresponding first field in the associated first record, the configuration data including information of the configuration of each of the EGMs, wherein the first operational software controls execution of a first set of ongoing functions of the server; and computer readable storage instructions for automatically transferring at least some of the existing configuration data stored in the first fields of the first records of the first data structure template from the non-volatile storage by migration software operating on the server to corresponding second fields of second records of a second data structure template used by second operational software of the server, where the second operational software differs from the first operational software, where the migration software reconfigures or reloads the existing configuration data in accord with the second data structure template for use by the second operational software, and where the second operational software controls execution of a second set of ongoing functions of the server, wherein a position of at least one of the first fields in the first data structure template for storing first information of the configuration data differs from a position of a corresponding one of the second fields in the second data structure template for storing the first information.

14. The non-transitory computer readable storage medium of claim 1 further comprising computer readable storage instructions for comparing types of second fields in the second data structure template with types of first fields in the first data structure template to determine which, if any, types of first fields in the first data structure template correspond to each type of second field in the second data structure template.

15. The non-transitory computer readable storage medium of claim 14 further comprising computer readable storage instructions for creating a map of the second fields in the second data structure template that match a corresponding first field in the first data structure template.

16. The non-transitory computer readable storage medium of claim 13 further comprising computer readable storage instructions for determining if data is not present in a selected second field in the second data structure template, where the selected second field has been predetermined to require the presence of data.

17. The non-transitory computer readable storage medium of claim 16 further comprising computer readable storage instructions for identifying the selected second field by the use of visual indicia on a display screen utilized by a system administrator.

18. The non-transitory computer readable storage medium of claim 13 further comprising computer readable storage instructions for loading said second operational software on the server and causing the server to execute the second operational software following the storing and transferring.

* * * * *

UNITED STATES PATENT AND TRADEMARK OFFICE

CERTIFICATE OF CORRECTION

PATENT NO. : 8,510,545 B2
APPLICATION NO. : 12/524430
DATED : August 13, 2013
INVENTOR(S) : Brian Bunin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this
Fifteenth Day of September, 2015

Michelle K. Lee
*Director of the United States Patent and Trademark Office*